United States Patent [19]

Nemeth

[11] 4,040,998

[45] Aug. 9, 1977

[54] AQUEOUS DISPERSION OF CERAMIC SLURRY

[75] Inventor: Joseph Nemeth, St. Clair Shores, Mich.

[73] Assignee: Champion Spark Plug Company, Toledo, Ohio

[21] Appl. No.: 596,897

[22] Filed: July 17, 1975

[51] Int. Cl.² ............................................. C08L 83/04
[52] U.S. Cl. .......................... 260/29.2 M; 106/73.4; 106/73.5; 260/37 SB
[58] Field of Search ................. 260/29.2 M, 37 SB; 106/39.5, 73.4, 73.5; 252/117

[56] References Cited

U.S. PATENT DOCUMENTS

| | | | |
|---|---|---|---|
| 2,586,496 | 2/1952 | Young et al. ......................... | 252/117 |
| 2,744,011 | 5/1956 | Samuel et al. ...................... | 260/37 SB |
| 3,090,691 | 5/1963 | Weyer ..................................... | 106/39 |
| 3,098,833 | 7/1963 | Solomon ................................. | 260/18 |
| 3,108,985 | 10/1963 | Weyer .................................. | 260/37 SB |
| 3,505,278 | 4/1970 | Elarde ..................................... | 260/37 |

*Primary Examiner*—Theodore E. Pertilla
*Attorney, Agent, or Firm*—John C. Purdue

[57] ABSTRACT

The present invention relates to a novel aqueous dispersion of a silicone resin and alumina. The dispersion is prepared by mixing 50-90 parts by weight of alumina, 6-45 parts by weight of a phenyl lower alkyl silicone resin and ½-6 parts by weight of a flux with from ½-7 parts by weight of an alkylolamine detergent in sufficient water to form a dispersion having a viscosity ranging from 300 to 3,000 centipoises.

2 Claims, No Drawings

AQUEOUS DISPERSION OF CERAMIC SLURRY

BACKGROUND OF THE INVENTION

This invention relates to an improved aqueous dispersion of alumina and a silicone resin.

Open-celled porous ceramic structures are useful for diverse applications such as catalyst supports and as heat-resistant filters for molten metals. Such structures can be formed by mixing together a ceramic material and a binder, saturating a porous material with the binder, and heating the saturated material to a temperature sufficient to vitrify the ceramic material and to destroy the porous material. For example, U.S. Pat. No. 3,090,094 discloses a method for producing such an article. A slurry of a finely divided ceramic powder and a ceramic binder is produced and a polyurethane sponge is immersed in the slurry. The saturated sponge is then heated to a temperature of about 2500° F. to burn out the sponge and to vitrify the slurry into an open-celled ceramic material.

U.S. Pat. No. 3,090,691 discloses mixing together a silicone resin and a volatile-free ceramic material under heat and pressure to form a coherent mass and heating the mass to obtain a ceramic article.

In commonly assigned application Ser. No. 571,602 filed Apr. 25, 1975 a method for producing a cellular ceramic catalyst support is disclosed. The method comprises impregnating an organic sponge flocked with wood or textile fibers with a slurry of alumina and a silicone resin, the latter being a phenyl lower alkyl silicone resin dissolved in an organic solvent. The viscosity of this slurry can be decreased by addition of a compatible organic thinner such as toluene, xylene, an alcohol or a chlorinated solvent. As disclosed, the support consists of a random-fiber ceramic framework with a high surface area which can be glazed and plated to function in catalytic reactions. The organic slurry can be used, with difficulty, to saturate, for example, a polyurethane sponge. The organic solvent not only makes impregnation difficult; it is also undesirable because of the volatility of the solvent and the danger posed by the vapors produced when the sponge saturated with the slurry is subjected to a high temperature sintering operation.

SUMMARY OF THE INVENTION

The instant invention is based upon the discovery of a novel aqueous dispersion of alumina and a silicone resin.

The dispersion is prepared by mixing 50-90 parts by weight of alumina, 6-45 parts by weight of a phenyl lower alkyl silicone resin, and ½-6 parts by weight of a flux with from ½-7 parts by weight of an alkylolamine detergent and sufficient water to form a dispersion having a viscosity from 300 to 3,000 centipoises. The silicone resin is one wherein the total of the phenyl and lower alkyl groups divided by the number of silicon atoms is from 0.9 to 1.5.

It is, therefore, an object of the present invention to provide an aqueous dispersion of a silicone resin and alumina.

DESCRIPTION OF THE PREFERRED EMBODIMENT

A liquid aqueous dispersion according to the invention of a silicone resin and alumina was prepared by blending together the following:

|  | Parts by Weight |
|---|---|
| Alumina | 85.3 |
| Silicone resin* (60 percent by weight solids in toluene) | 9.4 |
| $CaCO_3$—$MgCO_3$ (dolomite) | 2.9 |
| $CaCO_3$ (whiting) | 2.4 |
| Detergent | 0.7 |
| Water | 12.9 |

*The resin used is commercially available from Dow Corning Corporation under the designation "2106 Resin".

The silicone resin alumina slurry prepared as described above was utillized as described below to prepare an open mesh, random fiber, ceramic structure useful as a catalyst support:

A sample of urethane sponge approximately 1 inch in diameter by ½ inch in length was coated with a plastic adhesive dissolved in a toluene-methylethylketone solvent. The coated sponge was then flocked by applying wood flour from a fluidized bed. The flocked urethane sponge was immersed in the dispersion of the silicone resin and alumina produced as described above, squeezed and released until the sponge sample was thoroughly impregnated, and then removed from the dispersion. Impregnation of the sponge was readily accomplished using the high-alumina aqueous ceramic slurry composition described above. The excess slurry was removed and the sponge, after air drying for 24 hours, and oven drying for one hour at about 200° F., was sintered by firing at a temperature of about 2750° F. for about 3 hours. The sintering operation burned the urethane sponge and produced a vitrified mullite ceramic from the alumina and silica, the latter having been formed by decomposition of the silicone resin.

After firing, the mullite ceramic had the following composition:

|  | Percent by Weight |
|---|---|
| Alumina | 91.3 |
| $SiO_2$ | 6.0 |
| CaO | 2.0 |
| MgO | 0.7 |

In contrast, experimental tests indicate that satisfactory impregnation of a urethane sponge with a non-aqueous ceramic slurry of a silicone resin and a large proportion of alumina is difficult to achieve. For example, a composition comparable to that described above, but made using toluene as a solvent, did not impregnate a urethane sponge satisfactorily, even when the toluene was present in an amount up to 18 parts by weight.

The unglazed catalyst support produced as described above has adequate strength and resistance to cracking and spalling to render it useful in diverse static applications. However, if it is desired to use the catalyst support material in a dynamic environment, for example in a catalytic converter for the exhaust from an internal combustion engine, increased strength and surface area of the support material is desirable. These can be provided by glazing the sintered ceramic support structure produced as described above with a glaze slurry having the following high-silica composition (on an oxide basis):

| Glaze | Percent by Weight |
|---|---|
| $SiO_2$ | 78.77 |
| $Al_2O_3$ | 14.97 |
| CaO | 4.22 |

-continued

| Glaze | Percent by Weight |
|---|---|
| Na$_2$O | 0.70 |
| K$_2$O | 1.29 |

The support structure can be immersed in the glaze slurry and gently agitated for about 10 seconds, removed and air-dried. The support structure can be dried at 900° F. for 15 minutes and glost-fired at about 2700° F. for a period of about 30 minutes. The surface area of the glaze support can be further increased by immersion in a second glaze slurry having the following composition (on an oxide basis):

| Glaze | Percent by Weight |
|---|---|
| SiO$_2$ | 47.26 |
| Al$_2$O$_3$ | 8.99 |
| CaO | 2.54 |
| Na$_2$O | 0.43 |
| K$_2$O | 0.78 |
| CuO | 25.0 |
| ZrO$_2$ | 15.0 |

This structure can be dried again at 900° F. and fired at 1500°-2100° F. for five minutes to produce a textured, exterior of high surface area.

A catalyst surface can be produced on the glaze support by electrolessly plating with nickel. The cellular supported catalyst produced as described and plated with nickel can be used as a reduction catalyst for exhaust gases from an internal combustion engine.

As described hereinbefore, an aqueous slurry according to the invention can be used to produce a vitrified mullite body which can be glazed and then plated to perform as a catalytic converter. In order to perform successfully under severe operating conditions, the vitrified ceramic cellular structure must have sufficient refractoriness along with low thermal expansion to resist both attrition loss and thermal shock. Studies conducted to maximize the strength of the vitrified ceramic included investigation of various compositions along the mullite-cordierite tie-line of the MgO—Al$_2$O$_3$—SiO$_2$ phase diagram. These tests indicated that even a 25 percent cordierite addition decreased the mullite strength to unsuitable levels.

To provide a high-strength vitrified ceramic cellular structure after the sintering operation, the slurry requires a fluxing material. Preferably about 3 percent by weight is present. A combination of calcium-magnesium carbonate and calcium carbonate, which provides a CaO-MgO flux during the firing step, is preferred. CaO and MgO or burned dolomite can be added for fluxing but, for economic reasons, use of unburned dolomite is preferred. CaO and MgO form a eutectic at about 74 weight percent CaO and 26 weight percent MgO. When silica, up to about 25 mole percent, is also present, the proportion of CaO in the eutectic increases somewhat. Tests were conducted on a series of bodies containing increasing percentages of a flux: CaCO$_3$ and MgCO$_3$ in proportions to form the eutectic. Samples containing the flux in amounts greater than about 4 percent by weight deformed during the sintering; the highest compressive strength was obtained on samples containing about 3 percent by weight of the flux.

A CaCO$_3$—MgCO$_3$ dolomitic limestone, suitable for use in the instant invention is available from Ohio Lime Company under the trade designation "Stonelite". "Stonelite" is described as a 300 mesh limestone containing about 54.7 percent CaCO$_3$, 44.7 percent MgCO$_3$, the remainder being Fe$_2$O$_3$, SiO$_2$ and Al$_2$O$_3$. The proportion of CaCO$_3$ and MgCO$_3$ can be adjusted by addition of whiting so that the eutectic is formed. A useable compositional range for a ceramic slurry including a CaCO$_3$—MgCO$_3$ flux, is listed below:

| | Parts by Weight |
|---|---|
| Al$_2$O$_3$ | 50-90 |
| SiO$_2$, silicone resin | 6-45 |
| CaCO$_3$—MgCO$_3$, CaCO$_3$ | ½-6 |
| Solvent | 4-18 |
| Detergent | ½-7 |
| H$_2$O | As Needed |

In addition to the CaCO$_3$—MgCO$_3$ flux described above, other compounds have been used as fluxing agents in the ceramic slurry. Compounds such as MnO$_2$ (up to 2 percent by weight) BaB$_2$O$_4$, MnO$_2$.TiO$_2$ and V$_2$O$_5$ have been successfully incorporated into the slurry composition.

The silicone resin in the slurry performs as a binder after a sponge, e.g., is impregnated therewith; the slurry has an adequate working time, and sets rapidly. In addition, an article produced by impregnating a sponge or the like with the slurry has good structural integrity during the sintering operation. The silicone resin additionally provides silica for the vitrified article, in the foregoing example to adjust the Al$_2$O$_3$:SiO$_2$ ratio to the mullite composition during the sintering operation. As indicated above in the compositional range given, the total amount of SiO$_2$ present in the vitrified article is derived from the SiO$_2$ and silicone resin present.

Organic silicone materials which are suitable for use in the instant invention are disclosed in U.S. Pat. Nos. 3,090,691 and 3,108,985. Particularly useful in the instant invention are phenyl lower alkyl silicone resins wherein the total of phenyl and lower alkyl groups divided by the number of silicon atoms is from 0.9 to 1.5. Preferably, the alkyl group has not more than 4 carbon atoms. In particular, the silicone resin available from Dow Corning Corporation under the trade designation "2106 Resin" is suitable; this resin is described as having the following properties:

ASTM-D-1346 Solids Content (3 hours at 275° F.) .. . 59 minimum

ASTM-D- 445 Viscosity (At 77° F.) . . . 20-50

As disclosed, the formulation described included a silicone resin commercially available as "2106 Resin", containing toluene as a solvent. In order to produce an aqueous dispersion of the ceramic slurry, it is critical that the slurry include from ½ to 7 parts by weight of a detergent. Sufficient water can then be added to the slurry to produce an aqueous dispersion having a desired viscosity from 300 to 3,000 centipoises. Most desirably the viscosity is from 1800 to 2200 centipoises.

The detergent used is a reaction product of an alkylolamine and an acylating substance. Detergents which are suitable for use in the instant invention are disclosed in U.S. Pat. No. 2,586,496. In particular, a suitable detergent is a combination of either a monoacylated or a multiacylated alkylolamine product with a soap having a fatty acid radical of more carbon atoms than the acyl radical in the alkylolamine reaction product.

What I claim is:

1. An aqueous dispersion consisting essentially of from 50 to 90 parts by weight alumina, from ½ to 6 parts by weight flux, from 6 to 45 parts by weight silicone resin which consists essentially of a phenyl lower alkyl silicone resin wherein the total of phenyl and lower alkyl groups divided by the number of silicon atoms is from 0.9 to 1.5 and each alkyl group has not more than 4 carbon atoms, from ½ to 7 parts by weight detergent which is a combined alkylolamine condensate of an intermediate fatty acid and alkylolamine soap of a higher fatty acid, and sufficient water that said dispersion has a viscosity at 25° C. of from 300 to 3,000 centipoises.

2. An aqueous dispersion as claimed in claim 1 wherein there are present about 85 parts by weight alumina, about 5 parts by weight flux, about 9 parts by weight silcone resin and about 1 part by weight detergent.

* * * * *